Feb. 21, 1967　　MITSUYOSHI MATINO ETAL　　3,304,821
METHOD AND APPARATUS FOR CUTTING CONTINUOUS FIBER TOWS
Filed Sept. 28, 1965　　　　　　　　　　　　　　　　4 Sheets-Sheet 1
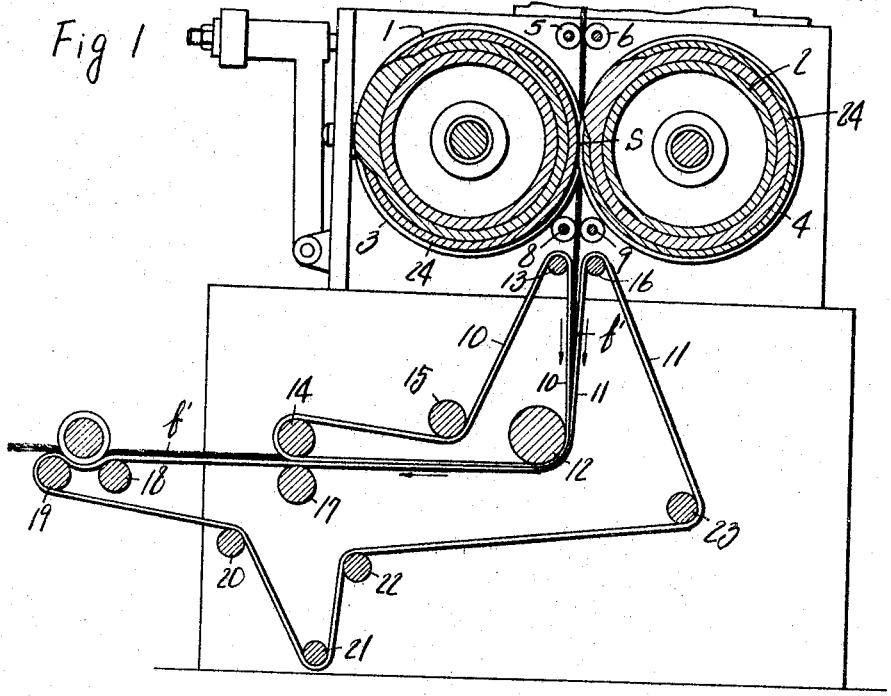
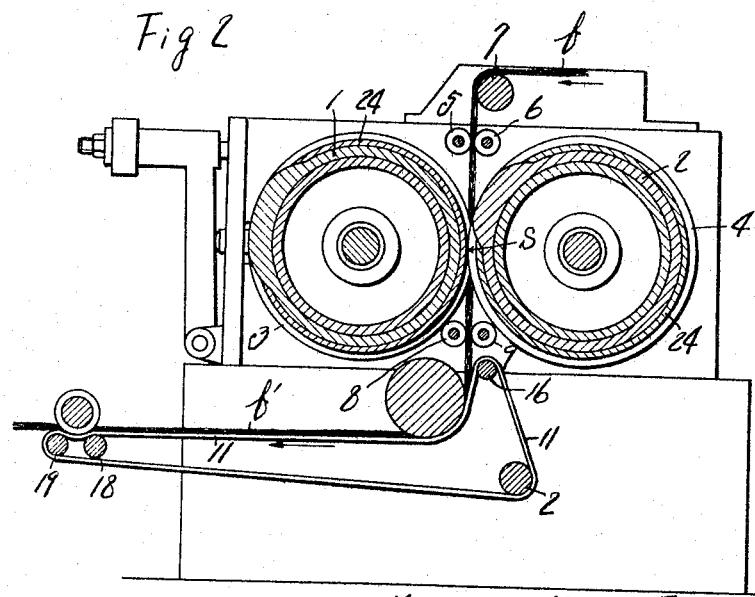
MITSUYOSHI MATINO, TADASHI SIGEMATSU,
TOSHIMOTO MATSUBARA, MASAAKI TABATA,
& SHIGEKI KITAZAWA,
　　　　　　　　INVENTORS
BY Hull + Houghton MITSUYOSHI MATINO, TADASHI SIGE-
MATSU, TOSHIMOTO MATSUBARA, MASAAKI
TABATA, & SHIGEKI KITAZAWA, INVENTORS BY Hall Anguta INVENTORS
MITSUYOSHI MATINO,
TADASHI SIGEMATSU,
TOSHIMOTO MATSUBARA,
MASAAKI TABATA, &
SHIGEKI KITAZAWA,

BY

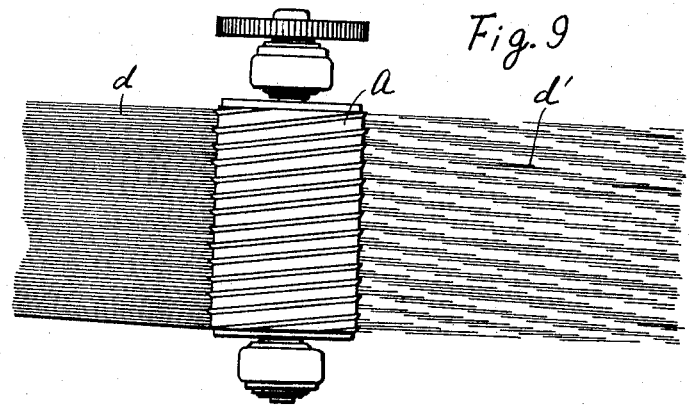
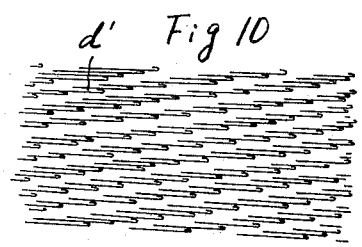
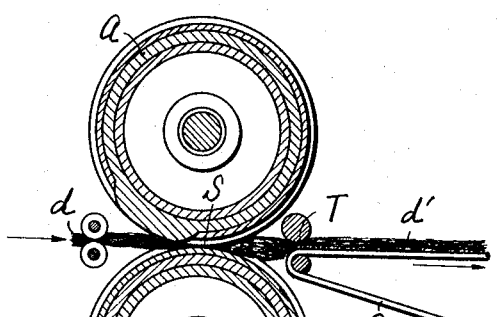
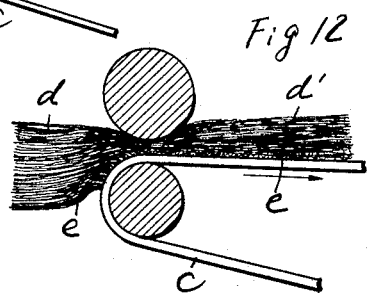

United States Patent Office 3,304,821
Patented Feb. 21, 1967

3,304,821
METHOD AND APPARATUS FOR CUTTING CONTINUOUS FIBER TOWS
Mitsuyoshi Matino, Kurita-gun, and Tadashi Sigematsu, Toshimoto Matsubara, Masaaki Tabata, and Shigeki Kitazawa, Otsu-shi, Japan, assignors to Osaka Kiko Kabushiki Kaisha, Osaka-shi, Japan
Filed Sept. 28, 1965, Ser. No. 490,853
Claims priority, application Japan, Apr. 1, 1965, 40/19,369
6 Claims. (Cl. 83—26)

This invention relates to a cutting apparatus wherein continuous fiber tows are fed to and passed through a pair of cutter rollers whereby they are cut into required lengths by the rubbing or scissoring action of cooperating spiral upright projecting tow severing shear blades on said rollers, and the lengths of tows may then be gathered together to form slivers supplied to the subsequent process in textile operation.

Objects and features of the invention will appear as the description proceeds with reference to the accompanying drawings in which:

FIGS. 1, 2 and 3 are side elevational views, in longitudinal section, of first, second and third embodiments of the invention, respectively;

FIGS. 7, 8 and 9 are a front elevational view, in longitudinal section, a side elevational view, in longitudinal section, and a plan view of the cutter roller part of a conventional cutting apparatus, respectively;

FIG. 10 is a rear end view of fiber tows cut by the conventional cutting apparatus;

FIG. 11 is a front elevational view, in longitudinal section, of the cutter roller part and is intended to analyze the cause of hooks being formed on the lower portions of fiber tows cut by the conventional cutting apparatus; and FIG. 12 is an enlarged fragmentary view thereof.

Figure 7:
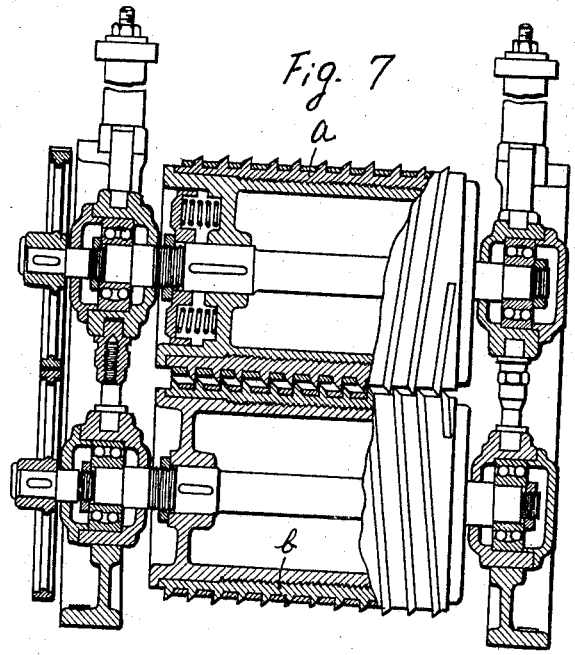
Figure 8:
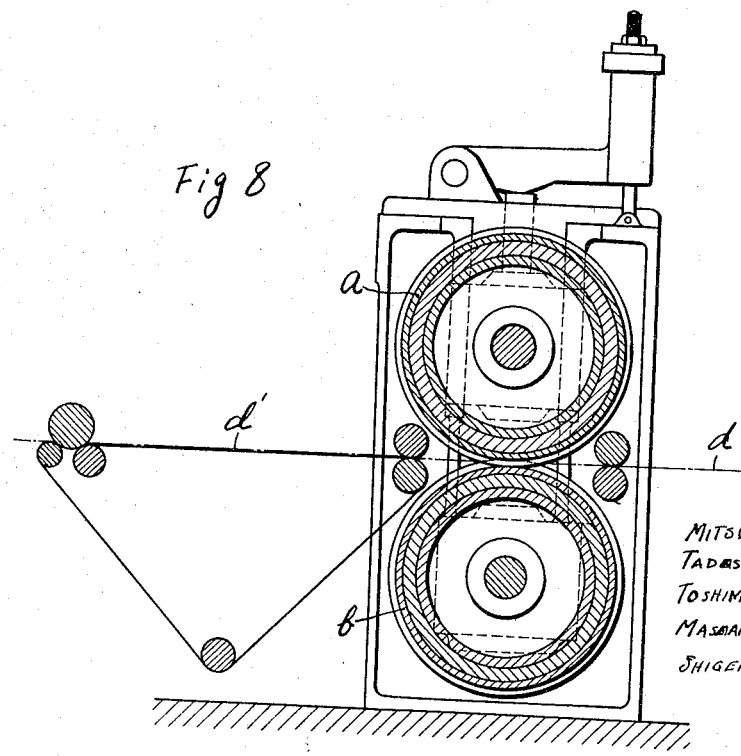

In a conventional fiber tow cutting apparatus using cutter rollers, as shown in FIGS. 7 and 8, a pair of cutter rollers $a$ and $b$ are vertically disposed and continuous fiber tows $d$ are horizontally passed therethrough to be cut obliquely by the rubbing together of cooperating spiral shear blades on the cutter rollers. In such a cutting arrangement, however, the obliquely cut fiber tows $d'$ will sag by their own weight before they are passed from the cutting point S between the cutter rollers $a$ and $b$ shown in FIG. 11 to an endless transfer belt $c$, whereby this space transfer portion is downwardly bent. As the result, the cut ends of the lower cut fibers of the fiber tows $d'$ run against the curved surface of the endless transfer belt $c$ and are bent to form hooks $e$ as shown in FIGS. 10 through 12. Consequently, the orientation of fibers on the rear surface of the fiber tows $d'$ is disturbed as shown in FIG. 10, so that fiber breakage and nep formation inevitably occur in the subsequent gilling process, thus causing a considerable lowering of efficiency in textile operation.

In view of these drawbacks inherent to the conventional apparatus, the present invention provides an improved apparatus wherein a pair of cutter rollers are horizontally disposed to be pressed against each other in such a position as not to cause the bending of cut fiber tows due to their own weight, so that fiber tows are vertically downwardly supplied to the rubbing areas between said two cutter rollers for cutting the same, the thus cut fiber tows being then vertically or obliquely downwardly guided and thereafter being transferred by an endless transfer belt or belts to be fed to the next apparatus.

A few embodiments of the invention will now be described with reference to the drawings.

Figure 4:
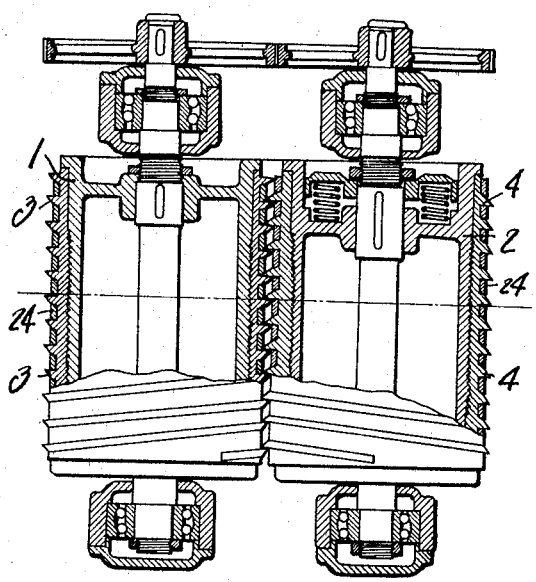
FIG. 4 is a plan view of cutter rollers.
Figure 5:
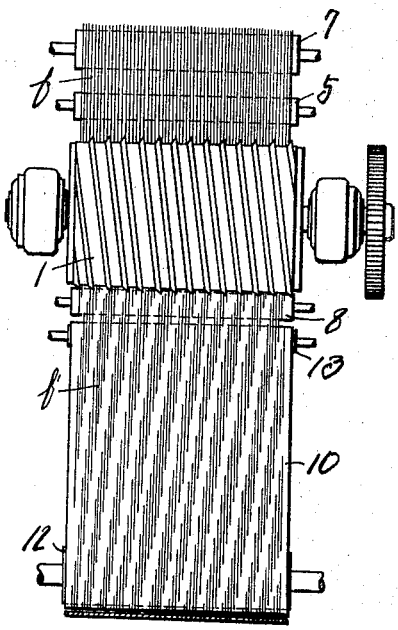
FIG. 5 is a front elevational view thereof.

FIG. 1 shows a first embodiment, in which the reference numerals 1 and 2 designate cutter rollers. The cutter rollers 1 and 2 are horizontally positioned, one on the right and the other on the left, and are pressed against each other by suitable means. These cutter rollers are provided with cooperating upright projecting shear blades 3 and 4 spirally wound thereon at the same pitch. The directions of spiral winding of the upright projecting blades 3 and 4 are opposite to each other, and as best shown in FIG. 4, the edges of the blades 3 and 4 rub past each other with a scissors-like shearing action for completely severing the tow fibers into short sections as illustrated in FIG. 5. Arranged right and left above the rubbing areas between the two horizontally mounted cutter rollers 1 and 2 are two feed rollers 5 and 6, above which is positioned a guide roller 7 in the manner shown in FIG. 2. Two delivery rollers 8 and 9 are horizontally positioned below the cutter rollers 1 and 2 in such a manner as to cooperate with each other for holding fiber tows therebetween. Provided below these delivery rollers 8 and 9 are two endless transfer belts 10 and 11, upper and lower, pressed against each other. These two endless belts 10 and 11 serve to transfer, while perfectly holding therebetween, fiber tows $f'$ cut by the cutter rollers 1 and 2, and the holding sections of the endless transfer belts 10 and 11 travel vertically downwardly and they pass over a common guide roller 12, thereby effecting pressed gripping and horizontal and arcuate transfer of fiber tows. The upper portions of the vertical sections of the endless transfer belts 10 and 11 are somewhat opened or spaced apart to form a vertically downwardly contracting nip region to facilitate the reception of fiber tows, thereby guiding the latter to the curved sections. The endless transfer belt 10 is moved in a vertical direction and then in a horizontal direction by means of a series of guide rollers 12, 13, 14 and 15. Similarly, the other or lower endless transfer belt 11 is moved in a vertical direction and then in a horizontal direction through the intermediary of a series of guide rollers 16, 12, 17, 18, 19, 20, 21, 22 and 23.

Fiber tows $f$ horizontally transferred above the cutter rollers 1 and 2 are vertically downwardly moved due to the guide roller 7 and passed between the feed rollers 5 and 6 to the rubbing areas of the cutter rollers 1 and 2 where they are nipped at the nip point provided by the cutter rollers and obliquely cut into the echelon form shown in FIG. 5. The thus formed echelons of cut fiber tows are then gripped between the delivery rollers 8 and 9 so as to be vertically downwardly guided to the endless transfer belts 10 and 11 where they are held therebetween to be further downwardly guided with the oblique orientation thereof maintained, and finally they are horizontally transferred by the arcuate-to-horizontal travel of the endless transfer belts 8 and 9 without involving disturbance in fiber orientation on either surface of the cut fiber tow sheet. As shown, band members 24 of rubber or other soft elastic material are wound on and packed in the bottoms of the spiral pitch grooves of the upright projecting blades 3 and 4 of the right and left cutter rollers 2 and 1. The packing of such band members 24 of soft elastic material provides means for accurate pressure gripping of fiber tows at the instant of cutting, thus further assuring the prevention of the cut fiber tows from being disturbed in orientation.

FIG. 2 shows a second embodiment of the present invention, the parts corresponding to those shown in the first embodiment being designated by like reference characters as used in the latter.

In this embodiment, a single endless transfer belt 11 is adapted to guide and transfer cut fiber tows $f'$ in a vertical direction and then in a horizontal direction.

Figure 3:
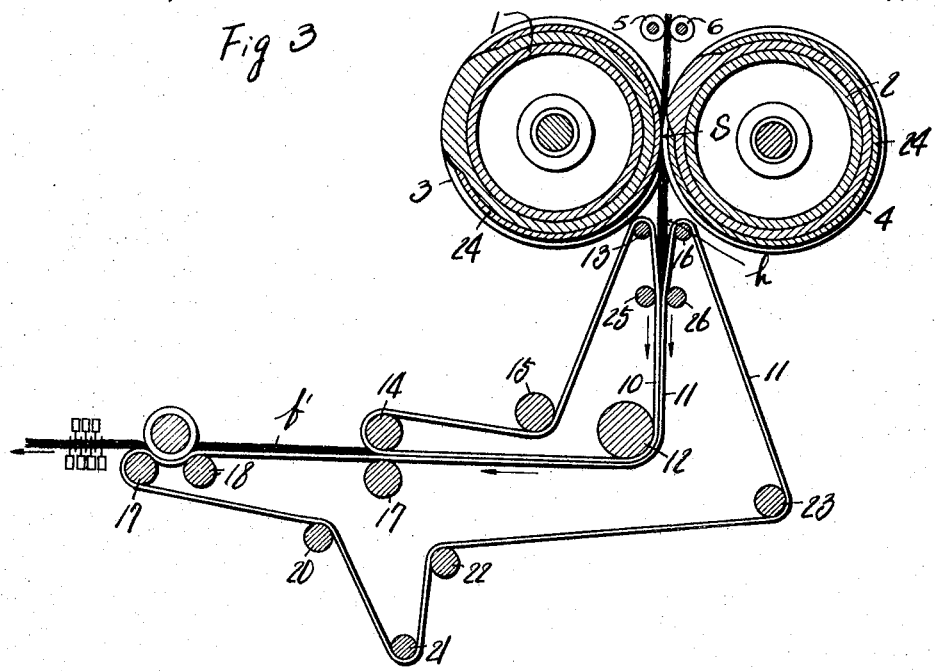

FIG. 3 shows a third embodiment, the parts corresponding to those shown in the first embodiment being designated by like reference characters used in the latter.

In this embodiment, below the rubbing areas of two cutter rollers, two guide rollers 13 and 166 at the receiving ends of two endless transfer belts 10 and 11 are positioned at as short a distance as possible from said rubbing areas. These guide rollers 13 and 16 are slightly separated from each other to form an open guide portion $h$ at the upper ends of the endless transfer belts 10 and 11.

Catching roller 25 and 26 are provided between the open guide portion $h$ and the guide roller 12 so as to press the endless transfer belts 10 and 11 towards each other. The travelling speed of the endless transfer belts 10 and 11 is slightly greater than the feeding speed of the cutter rollers 1 and 2, thereby applying a draft action to the fiber tows $f'$ between the cutting point S of the cutter rollers 1 and 2 and the nip point of the endless transfer belts 10 and 11.

With the arrangement thus made, the fiber tows $f'$, after being obliquely cut by the cutter rollers 1 and 2 at the cutting point S, are easily drawn into the open guide portion $h$ of the endless transfer belts 10 and 11 and introduced into the nip point of the catching rollers 25 and 26 while being subjected to a slight draft, so that there is no possibility of the leading ends of the fiber tows running against the inner surfaces of the endless belts 10 and 11, nor the possibility of the fiber tows bulging to be outwardly curved. Consequently, the leading ends of the fibers are prevented from being curved in a hook shape, so that satisfactory fiber tows $f'$ with fiber orientation improved particularly on the front and rear surfaces can be obtained.

Figure 6:
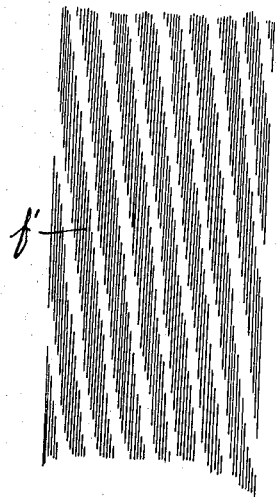
FIG. 6 is a rear end view.

From the foregoing it is understood that according to the present invention two cutter rollers 1 and 2 are horizontally positioned in pressure contact with each other and fiber tows $f$ are vertically downwardly driven and obliquely cut by the cutter rollers and then the thus cut fibers are vertically downwardly guided, followed by the change of the travelling direction thereof from vertical to horizontal effected by an endless belt or belts, with the result that the fiber tows $f'$ just after being cut do not sag, as contrasted with the conventional case and hence the leading ends of the fibers are not curved in a hook shape, with no occurrence of breakage and neps in the successive processes, whereby as shown in FIGS. 5 and 6 satisfactory tows of obliquely cut fibers having improved fiber orientation can be obtained. Thus the present invention promotes the textile efficiency of the system for cutting continuous synthetic fiber tows and directly forming them into slivers.

The foregoing detailed description is given for clearness of understanding only and no unnecessary limitations are to be understood therefrom, as some modifications will be obvious to those skilled in the art.

What is claimed is:

1. In a method of producing slivers from continuous fiber tows which comprises the steps of
   (a) severing continuous fiber tow being moved longitudinally of its fibers by cuts extending completely through the fibers and directed obliquely across the width of the tow and separating it into echelons of cut fiber tows, and
   (b) conveying the cut fiber tows substantially horizontally to a delivery point;
   the improvement which comprises preventing the deformation of leading ends of the cut fibers of the tows by
   (c) effecting the severing of step (a) while longitudinally moving the continuous fiber tows and resulting echelons vertically downwardly,
   (d) nipping the vertically downwardly moving echelons of cut fiber tows leaving the point of severance and delivering them longitudinally of the fibers thereof into a vertically downwardly contracting nip region between vertically downwardly moving conveyer surfaces paralleling the width of the tows, at least one of which surfaces is in the form of a belt guided to move substantially vertically at said nip region and substantially horizontally at said delivery point, and
   (e) holding the echelons of cut fiber tows against said belt for preventing relative displacement of the fibers thereof while the cut fiber tows are carried longitudinally by and turned with said belt from a substantially vertical position at said nip region to a substantially horizontal position for delivery at said delivery point.

2. A method as defined in claim 1, wherein the vertically downwardly moving conveyor surfaces at said nip region are moved at a slightly greater surface speed than that at which the echelons of cut fiber tows are delivered thereto from the point of severance, thereby applying a draft action to the fibers of the echelons of cut fiber tows being nipped at said nip region.

3. Apparatus for producing slivers from continuous fiber tow of the type which comprises
   (a) means for severing continuous fiber tow being moved longitudinally of its fibers by cuts extending completely through the fibers and directed obliquely across the width of the tow and separating it into echelons of cut fiber tows, and
   (b) means for conveying the cut fiber tows substantially horizontally to a delivery point;
   particularly characterized in that
   (c) said means (a) comprises cutter-rollers having opposed surfaces between which the fibers of the tows are nipped and having spirally arranged tow shearing blades extending from said surfaces and in overlapping rubbing relation to each other for shearing completely through the fibers nipped between said surfaces,
   (d) said cutter-rollers are so positioned that the plane including their axes is horizontal,
   (e) said apparatus comprises means for feeding continuous fiber tow longitudinally downwardly into the nip point of said cutter-rollers and means for rotating said cutter-rollers in the direction to nip, sever, and move vertically downwardly therebetween the tow fed thereto,
   (f) said means (b) comprising conveyor means providing vertically downwardly moving conveyor surfaces defining therebetween a vertically downwardly contracting nip region parallel to and juxtaposed below the nip point of said cutter rollers,
   (g) said conveyor means comprising a belt and means for driving, guiding, and turning the same to move substantially vertically downwardly at said nip region to provide one of said vertical surfaces, and to then turn and move substantially horizontally proximate to said delivery point, and
   (h) said conveyor means further comprising means providing the second of said vertical surfaces and disposed for holding the nipped echelons of cut fiber tows against said belt for preventing relative displacement of the fibers thereof while the cut fiber tows are carried by and turned with said belt from a substantially vertical position at said nip region to a substantially horizontal position for delivery at said delivery point.

4. Apparatus as claimed in claim 3, in which the means providing the second of said surfaces comprises a second belt and means for guiding and turning said second belt to move substantially vertically downwardly at said nip region and to move in pressing relation to said first belt from said nip region at least until said second belt has been turned to said substantially horizontal position.

5. Apparatus as claimed in claim 4, in which the guiding means for said first and second belts comprises a first set of guide rollers parallel to each other and located to press said first and second belts together at a distance below the nip point of said cutter rollers and a second set of guide rollers parallel to said first set and lying between said first set and said cutter rollers, said second set of guide rollers having their proximate surfaces spaced more widely apart than those of said first set, whereby said belts are guided to form said vertically downwardly contracting nip region.

6. Apparatus as claimed in claim 4, which comprises means for driving the surface of said belt at a slightly greater speed than the nipping surfaces of said cutter rollers, thereby to apply a draft action to the fibers of the echelons of cut fiber tows being nipped at said nip region.

References Cited by the Examiner

UNITED STATES PATENTS

| | | | |
|---|---|---|---|
| 2,090,502 | 8/1937 | Oshima | 83—913 X |
| 2,248,806 | 7/1941 | Campbell | 83—913 X |
| 2,420,033 | 5/1947 | Fairbairn | 83—913 X |
| 2,692,645 | 10/1954 | Driesch | 83—355 |
| 3,164,047 | 1/1965 | Speicer et al. | 83—913 X |
| 3,205,741 | 9/1965 | Haselow | 83—106 |

FOREIGN PATENTS 1,273,016   8/1961   France.

WILLIAM W. DYER, JR., *Primary Examiner.*
J. M. MEISTER, *Assistant Examiner.*